(12) United States Patent
Pinson (10) Patent No.: US 6,256,748 B1
(45) Date of Patent: Jul. 3, 2001

(54) METHOD AND DEVICE FOR CONNECTING A DATA PROCESSING SYSTEM CENTRAL UNIT TO A REDUNDANCY DATA STORAGE SUBSYSTEM

(75) Inventor: Denis Pinson, Goupillieres (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/147,682

(22) PCT Filed: Apr. 23, 1998

(86) PCT No.: PCT/FR98/00814

§ 371 Date: Feb. 12, 1999

§ 102(e) Date: Feb. 12, 1999

(87) PCT Pub. No.: WO98/49619

PCT Pub. Date: Nov. 5, 1998

(30) Foreign Application Priority Data

Apr. 29, 1997 (FR) .................................................. 97/05279

(51) Int. Cl.⁷ ..................................................... G06F 11/00
(52) U.S. Cl. ...................................................................... 714/6
(58) Field of Search ........................................ 714/5, 6, 7

(56) References Cited

U.S. PATENT DOCUMENTS 4,684,885   8/1987   Chapman et al. .
5,140,691   8/1992   Austruy et al. .

FOREIGN PATENT DOCUMENTS

0 551 718    7/1993   (EP) .
WO 91 13399  9/1991   (WO) .
WO 91 17506  11/1991  (WO) .
WO 93 18456  9/1993   (WO) .

*Primary Examiner*—Robert Beausoleil
*Assistant Examiner*—Bryce Bonzo
(74) *Attorney, Agent, or Firm*—Miles & Stockbridge P.C.; Edward J. Kondracki (57) ABSTRACT

The system comprises a central processing unit (CPU) associated with one or more input-output controllers ($Ctl_1$–$Ctl_4$) and a subsystem of redundant disks (MD) divided into logic units and under the control of two redundant disk controllers (SP-A, SP-B). The latter are attached to the input-output controller(s) through equally redundant busses. A first part of the logic units is assigned to the first disk controller (SP-A) and the other part to the second disk controller (SP-B). When a logic unit assigned to the first disk controller (SP-A) is accessed, the state of the second disk controller (SP-B) is supervised through the backup path. In the event that a failure state of the second disk controller (SP-B) is detected, all of the logic units are switched to the first one (SP-A) and are assigned to it. A degraded operating mode is initiated and access to the resources is gained through the backup path.

17 Claims, 5 Drawing Sheets

METHOD AND DEVICE FOR CONNECTING A DATA PROCESSING SYSTEM CENTRAL UNIT TO A REDUNDANCY DATA STORAGE SUBSYSTEM

FIELD OF THE INVENTION

The present invention relates to a process for connecting the central processing unit of a data processing system to a redundant data storage system.

The invention also relates to a device for implementing the process.

More particularly, it relates to a device for connecting the central processing unit of a data processing system to a redundant array of magnetic disks, via controllers.

Within the scope of the invention, the term "controller" should he understood in its broadest sense; for example, it could mean a specialized processor with an internally stored program. Likewise, the term controller will be used for controllers disposed in input-outputs of the central processor or controllers of disks per se, or more generally of data storage units.

BACKGROUND OF THE INVENTION

Figure 1:
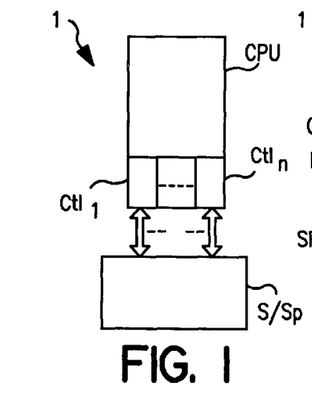
FIG. 1 schematically illustrates the general architecture of a data processing system according to the prior art.

FIG. 1 attached to the present specification illustrates in simplified fashion the general architecture of a data processing system. The data processing system 1 comprises a central processing unit CPU, controllers Ctl, through $Ctl_n$, and one or more peripheral subsystems S/SP. These subsystems can comprise, for example, single disks, redundant arrays of disks, magnetic tapes, or even printers.

The redundant arrays of disks can have various architectures, including the architectures known by the well-known acronym "RAID" (for "Redundant Array of Independent Disks").

The arrays of disks with a "RAID" architecture are in turn subdivided into several subcategories. Among others, it is possible to cite the architectures "RAID-1" and "RAID-5," though this is not exhaustive.

To begin with, let us briefly summarize the main characteristics of these two architectures, which are used to advantage within the scope of the invention.

To obtain redundancy of the "RAID-1" type, mirrored disks are used. According to this method, the data are recorded normally on a first disk, and redundantly on a second disk, physically distinct from the first one, which represents the "mirror" of the first one. When a "normal" disk is malfunctioning, the data can he read- and/or write-accessed from its "mirror" disk. This naturally requires doubling the storage capacity, and hence the number of physical disks, relative to what is actually needed.

Redundancy of the "RAID-5" type requires less additional storage capacity. The data is divided into segments of several blocks of a given length, which can be called "usable" data blocks. A redundant segment composed of parity blocks is associated with a given number of segments.

According to this method, several physical disks are also used. In general, the disks are partitioned into "slices" and a "rotating parity" data recording schema is used.

Figure 2A:
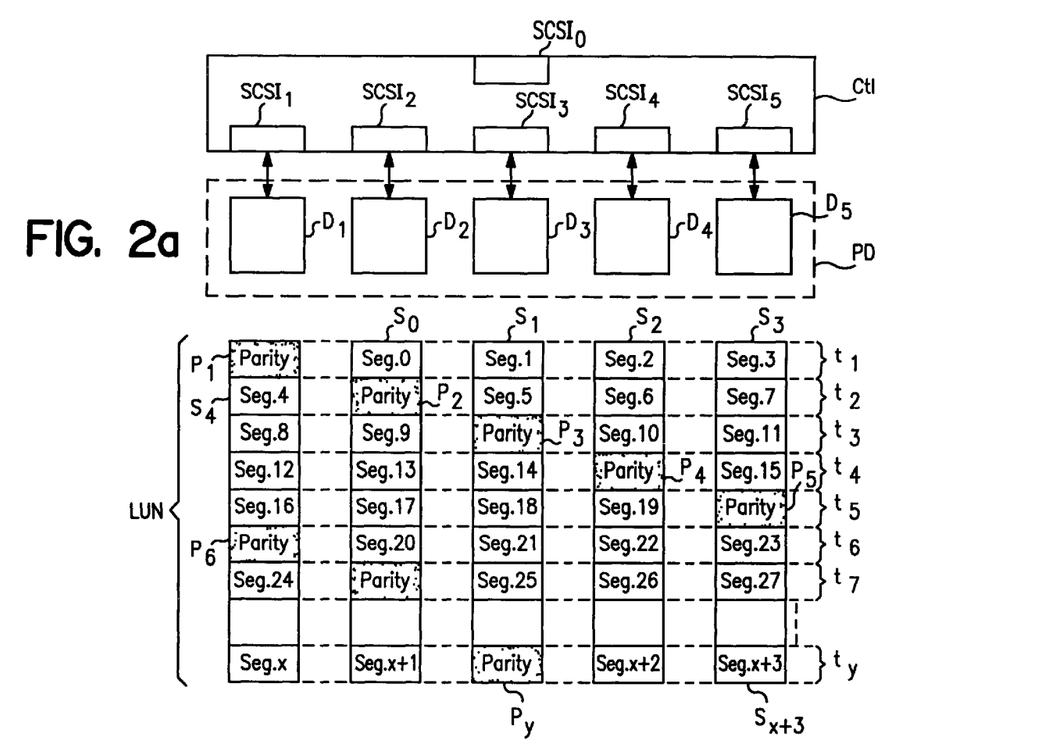
FIGS. 2a and 2b illustrate two redundant disk architectures according to the prior art.

FIG. 2a attached to the present specification illustrates this recording method with "RAID-5" type redundancy and rotating parity. By way of example, it is assumed that the data storage subsystem comprises five physical disks $D_1$ through $D_5$ under the control of a single controller Ctl, for example equipped with interfaces of the type known by the name "SCSI" for "Small Computer System Interface," $SCSI_1$ through $SCSI_5$. The controller Ctl also comprises an interface of the same type $SCSI_0$ connected to the central processor (not represented). The bottom part of FIG. 2a represents the logical configuration of the memory, with storage equivalent to the five disks $D_1$ through $D_5$. Each group of disks $D_1$ through $D_5$ is called a physical device PD.

This array is divided into y slices, $t_1$ through $t_y$. It is assumed that only one segment is recorded in any slice of a disk, for example the segment $S_0$ ("Seg. 0") in the slice $t_1$ of the disk $D_2$. If one parity segment $P_1$ (stored in the slice $t_1$ of the disk $D_1$) is associated with four segments of usable data, $S_0$ through $S_4$, it is easy to see that there is a shift of the storage position of the next parity segment $P_2$: naturally, the latter is stored in the slice $t_2$ (in the example described), but on the disk $D_2$, not the disk $D_1$. A regular shift also exists for the segments $P_3$ through $P_5$, respectively stored on the disks $D_3$ through $D_5$. Once again, a parity segment $P_6$ is stored on the disk $D_1$, in the slice $t_6$. Therefore, there is a shift of modulo 5 and more generally of modulo d, d being the number of physical disks, and s=d-1 being the number of segments of usable data associated with a parity segment.

For the example illustrated by FIG. 2a, the map of the distribution among the disks $D_1$ through $D_5$ and the slices $t_1$ through $t_y$ of the usable data segments ($S_0$="Seg. $S_0$" through $S_{x+3}$="Seg. $S_{x+3}$") and the parity segments ("Parity $P_0$" through "Parity $P_y$") is shown in "TABLE 1," located at the end of the present specification.

Naturally, other distribution schemata are possible, but if rotating parity recording is desired, the ratio between the accumulated number of usable data segments and the number of associated parity segments and the number of physical disks cannot be just any ratio.

As defined above, the data storage space constitutes a de facto virtual memory space or logic unit LUN.

Figure 2B:
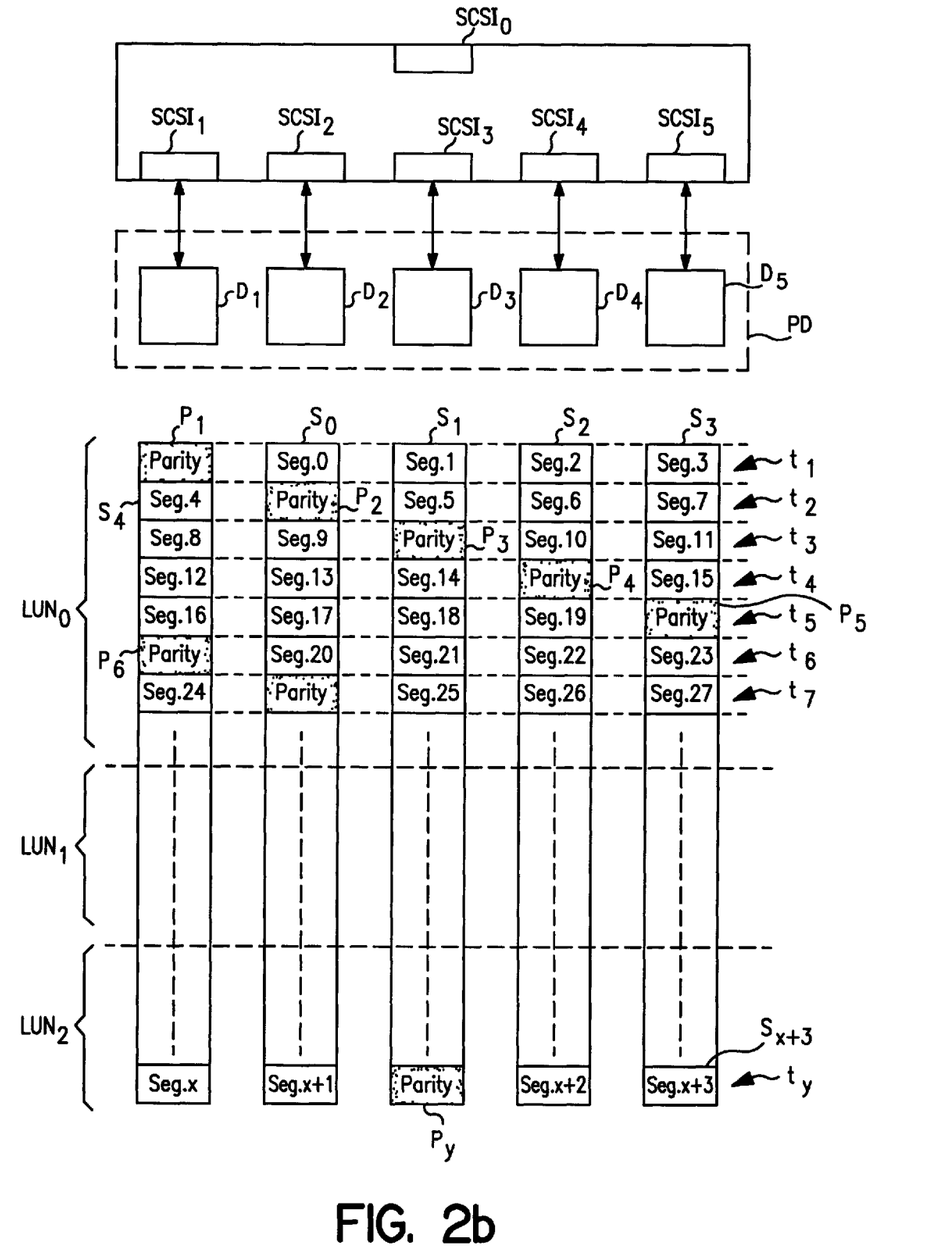

This virtual memory space can be further subdivided into several logic units $LUN_0$ through $LUN_2$, as is illustrated more particularly by FIG. 2b. Each logic unit $LUN_0$ through $LUN_2$ comprises a certain number of slices, the total number of segments (usable data and parity data) being equal to the number of slices multiplied by the number of physical disks. In the example described in FIG. 2b, it is assumed that the virtual disk array has been divided into three logic units $LUN_0$ through $LUN_2$. In other words, a "vertical" partitioning (by physical disks) has been replaced by a "horizontal" partitioning, for a given physical device PD. The number of partitions is chosen so as to obtain optimized performance as a function of the capacity of the elementary disks $D_1$ through $D_5$, and hence of their accumulated capacity (physical device PD). In the example described, each logic unit $LUN_0$ through $LUN_2$ forms a virtual disk with a capacity equal to one third of the accumulated capacity, i.e., of the capacity of the physical device PD.

The use of a redundant disk architecture for data makes it possible to solve only some of the problems caused by hardware failures. In fact, although not represented in the preceding figures, the disks or arrays of disks are placed under the control of at least one disk controller. In the event of a failure of this unit, access to all or part of the information would be seriously compromised. It has been proposed that redundancy also be introduced at this level, as illustrated in the detail in FIG. 3a. According to this architecture, the multiple disk array, with the common reference MD, is placed under the control of two disk controllers, in this case two data storage processors SP-A and SP-B, operating redundantly. The multiple disk array MD can comprise one or more physical units PD (FIGS. 2a and 2b), and hence, a fortiori, one or more logic units (FIG. 2b: $LUN_0$ through $LUN_2$). Normally, some of the disk space, and hence some of the logic units, (a priori half, or a value approximating half, as a function of the redundant architecture adopted), are assigned to one of the data storage processors, for example SP-A, and the rest to the other processor, for example SP-B.

Figure 3A:
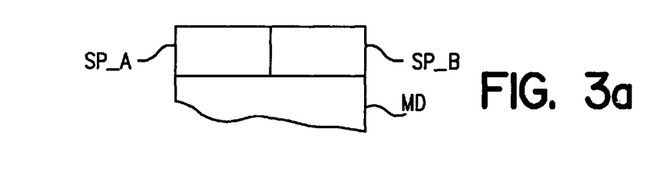
FIGS. 3a through 3c schematically illustrate the operation of redundant disk controllers according to two methods of the prior art.

In the normal operating mode, access to the first partition of the total disk space is gained via the processor SP-A, and access to the second partition of the disk space is gained via the processor SP-B. If a logic unit LUN#m (m being arbitrary and falling between 0 and n, n+1 being the maximum number of logic units) is assigned to SP-A, it is necessary to organize a redundancy of access to the resource LUN#m through the processor SP-B in the event of a failure of the processor SP-A. However, many types of processors available on the market would not make it possible to "see" the logic unit LUN#m directly through the processor SP-B.

Ordinarily, two methods are used, which will be explained in reference to FIGS. 3b and 3c.

Figure 3B:
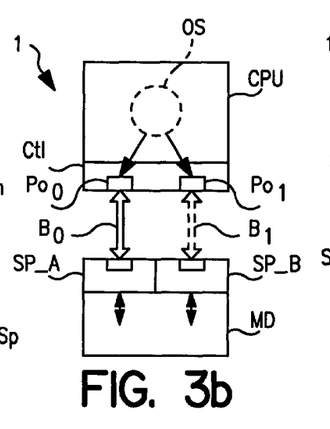

The first method is illustrated schematically by FIG. 3b. The input-output controller Ctl of the central processing unit CPU communicates through separate busses $B_0$ and $B_1$ with the processors SP-A and SP-B, under the control of the operating system OS of the central processing unit CPU. The operating system OS can be of any type. For example, it can be a "UNIX" or "GCOS"(registered trademarks) operating system. In the normal mode, access to the logic unit LUN#m assigned to the processor SP-A takes place via the bus $B_0$ (the solid lines in FIG. 3b). When a (software or hardware) failure that is inhibiting access to this logic unit LUN#m via the bus $B_0$ and the processor SP-A is detected, at least the logic unit LUN#m, or possibly all of the logic units assigned to the processor SP-A, are switched to the processor SP-B. Access is then gained via the bus $B_1$ (in broken lines), and the operation moves into the "degraded" mode. To do this, a command generally known as a "trespass," meaning a "forced assignment," is used. Naturally, the process for organizing the switching of the logic units assigned to the processor SP-B to the processor SP-A is entirely similar.

This method has the drawback of returning to the highest software "layers," i.e., to the level of the operating system OS of the central processing unit CPU. This results in a probable overload of the latter. It is even necessary to modify the code of some operating systems in order to be able to handle such specific tasks.

Figure 3C:
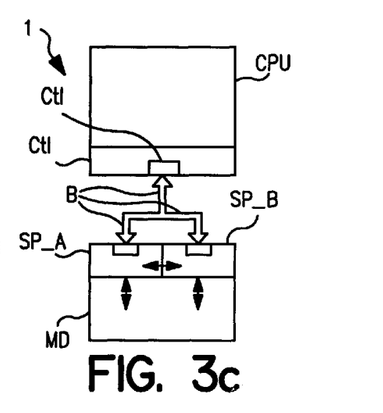

The second method is illustrated schematically by FIG. 3c. Only one bus B linking the controller Ctl to the redundant processors SP-A and SP-B is used. In the event that a failure is detected, a programmed function known as an "auto-trespass" is used, which organizes the automatic switching from one processor to the other.

This method, although it frees up the operating system OS of the central processing unit CPU, is nevertheless not without drawbacks. The fact that only one bus is available results in an overload, even in the normal mode. Moreover, only one physical channel is available between the control Ctl and the storage processors SP-A and SP-B.

The object of the invention is to eliminate the drawbacks of the processes of the prior art, while maintaining, or even improving, the redundancy of access to the data storage resources. In particular, its object is to provide an access to the redundant data storage resources that is transparent for the main system.

To this end, the control and detection of failures in the system input-output controller is made to "descend," which masks these tasks from the operating system. The physical architecture adopted is similar to that described in connection with FIG. 3b. In particular, two separate busses are used, one of which serves as the "normal" transmission path for a first disk controller, the other serving as a redundant (i.e., backup) transmission path for the other disk controller (the latter also being used redundantly), and vice versa.

SUMMARY OF THE INVENTION

Therefore, the subject of the invention is a process for connecting the central processing unit of a data processing system to a subsystem comprising data storage resources placed under the control of two data storage controllers operating redundantly, said central processing unit being associated with at least one input-output controller communicating with said data storage controllers through two separate data transmission paths, characterized in that it comprises at least the following steps:

1) an initial step for assigning all or some of said data storage resources to a first data storage controller;

2) a step for ascending through at least one input-output controller, via a so-called normal data transmission path, to at least one of said data storage resources assigned to said data storage controller, which is said to be active;

3) a step for supervising, via the other, so-called backup data transmission path, the state of the other, so-called backup data storage controller, and of said backup data transmission path.

Another subject of the invention is a process for connecting the central processing unit of a data processing system to a subsystem comprising data storage resources placed under the control of two data storage controllers operating redundantly, said central processing unit being associated with at least one input-output controller communicating with said data storage controllers through two separate data transmission paths, characterized in that it comprises at least the following steps:

1) an initial step for assigning all or some of said data storage resources to a first data storage controller;

2) a step comprised of executing input-output commands, transmitted by an input-output controller via said normal data transmission path, in order to access one of said data storage resources assigned to said active data storage controller;

3) a step for supervising the state of this controller and of said normal data transmission path; and in that when a failure state is detected during this last step, it comprises the following subsequent steps:

a/ a step for switching said data storage resources assigned to the active data storage controller to the backup data storage controller and for reassigning them to the latter; and b/ a step for re-executing said inputoutput commands through said backup data transmission path.

BRIEF DESCRIPTION OF THE DRAWINGS

The invention will be more clearly understood, and other characteristics and advantages will be made apparent, through the reading of the following description in reference to the attached figures, in which.

DESCRIPTION OF THE PREFERRED EMBODIMENTS

The process for connecting a central processing unit of a data processing system and a redundant disk subsystem according to the invention, as well as an exemplary device, will now be described in detail.

Figure 4:
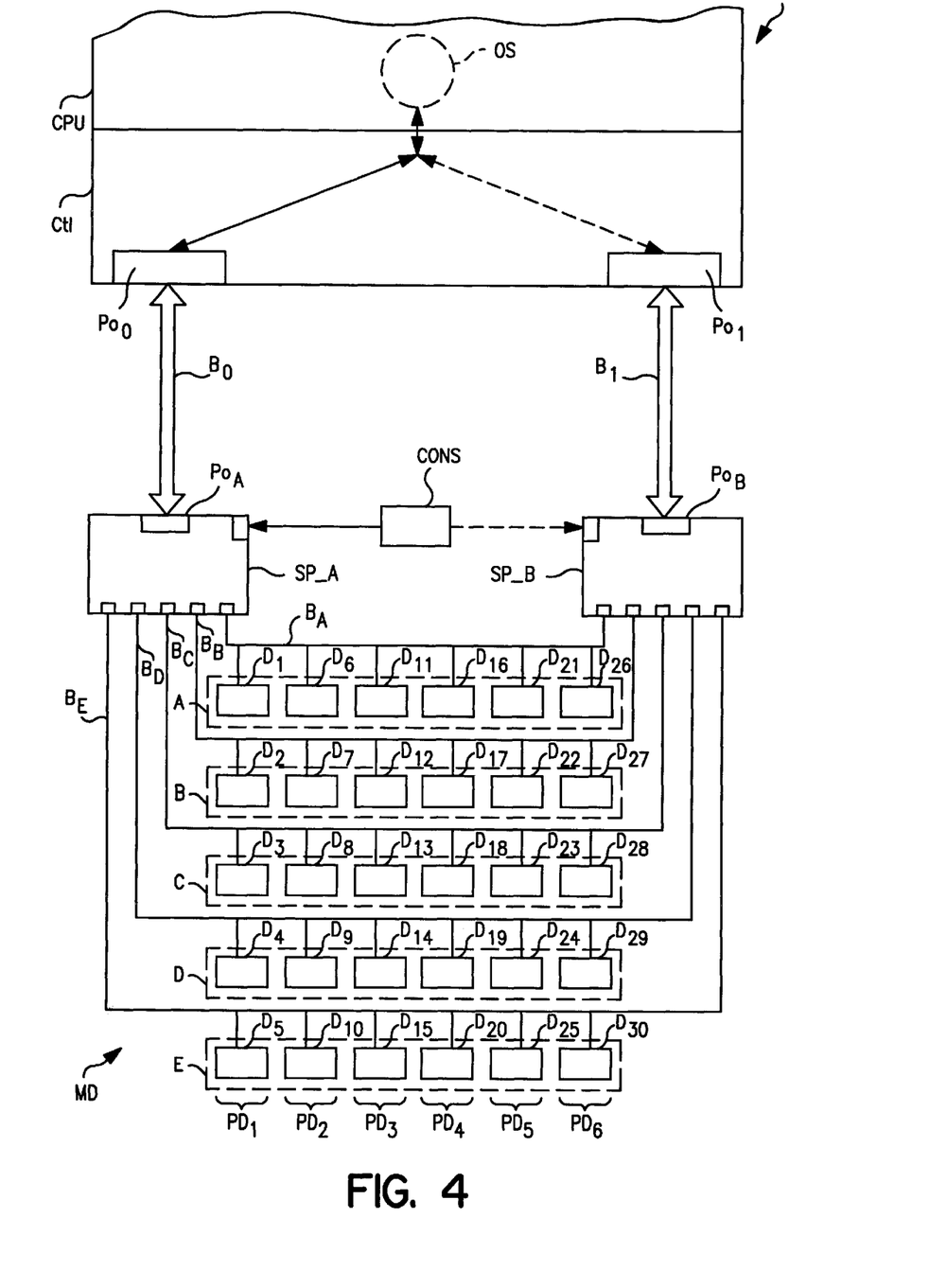
FIG. 4 schematically illustrates a first exemplary embodiment of a data processing system according to the invention.

To illustrate the concept, it is assumed that the multiple disk array MD comprises thirty individual disks $D_1$ through $D_{30}$, as is illustrated more particularly by FIG. 4. In the example described, these thirty disks are distributed among five "hardware" sub-arrays (drawers or cabinets) of six disks each, labeled by the letters A through E. Access to each of the disks in the five sub-arrays A through E is gained through five busses $B_A$ through $B_E$, each linked at a first end to the first storage processor SP-A, and at a second end to the second data storage processor SP-B, for example via interfaces of the "SCSI" type. The disks $D_1$ through $D_{30}$ are therefore arranged in a matrix organization of five "lines" and six "columns," the "lines" being formed by the sub-arrays A through E.

In a preferred embodiment of the invention, the storage redundancy can be configured (in an initial stage) according to either a "RAID-1" or "RAID-5" architecture. The initial configuration chosen is introduced into the storage processors SP-A and SP-B by means of a control console CONS, branched in round-robin fashion to a serial port of these two processors (or by means of two control consoles in a variant of embodiment, not represented).

To illustrate the concept, if the redundancy is of the "RAID-5" type, the five physical disks in each "column" of the matrix are associated and form physical devices $PD_1$ through $PD_6$, in a way similar to that described in connection with FIGS. 2a or 2b (the device PD). As indicated, each physical device can also be subdivided into logic units, for example into three logic units (FIG. 2b: $LUN_0$ through $LUN_2$). A priori, one half of the physical devices is assigned, in the normal mode, to the processor SP-A (for example the physical devices $PD_1$ through $PD_3$). The other half ($PD_4$ through $PD_6$) is assigned to the other processor SP-B.

The input-output controller Ctl of the central processing unit CPU communicates via two separate ports $Po_0$ and $Po_1$ with the storage processors SP-A and SP-B, respectively, via two busses $B_0$ and $B_1$, and two ports $Po_A$ and $Po_B$, each associated with one of the storage processors. All of these ports comprise, for example, interfaces of the "SCSI" type.

In "RAID-5" mode, the multiple disk array MD is "seen" by the central processing unit CPU and the operating system OS as eighteen logical disks identified by logic unit numbers (LUN#m), as will be shown below. In effect, five elementary (physical) disks are necessary to constitute a "RAID-5" group, or physical device $PD_1$ through $PD_6$, i.e., six groups. Since these groups are divided into three logic units, 6*3=18 logical disks are obtained.

In "RAID-1" mode, this same multiple disk array MD is "seen" as fifteen logical disks, or 2*15=30 elementary (physical) disks, also identified by logic unit numbers (LUN#m).

In order to obtain a configuration table of the addresses of the logical disks that can accommodate both modes of redundancy, during the initial configuration, the concept of an additional logical entity called a "logical device" is introduced, which device is also labelled by a number: LD#m, m being between 00 and 17. In fact, the maximum number of logical devices (and also of logic units) is equal to eighteen, and is obtained for a "RAID-5" type of redundancy.

In the example chosen, for a redundancy of the "RAID-5" type, the logical devices LD#00 through LD#08 are assigned to the processor SP-A and the logical devices LD#09 through LD#17 are assigned to the processor SP-B. For a redundancy of the "RAID-1" type, the logical devices LD#00 through LD#07 are assigned to the processor SP-A and the logical devices LD#09 through LD#15 are assigned to the processor SP-B (the logical devices LD#08 and LD#16 and LD#17 not being assigned for this type of redundancy).

In a practical exemplary embodiment, two transmission paths, i.e., "physical channels," are provided. In order to differentiate between these two physical channels, an address parameter PC#x is introduced. The subscript x has two distinct values, for example x=0 and x=2.

The physical channels are subdivided into logical channels LC#y, y being between 0 and 9 (the maximum value obtained for the "RAID-5" mode).

In order to completely and unambiguously address a logic unit LUN#m, or "target" to be (read- or write-) accessed, no matter which redundancy mode was initially configured ("RAID-1" or "RAID-5"), it is necessary to define an additional address parameter, which will be called the "SCSI" identification number (based on the type of interface chosen in the example described) or ID#z. The values that z can have depend on the redundancy mode. In "RAID-1" mode, only one identification number ID#z is necessary, for example z=02. In "RAID-5" mode, each sub-array of logical devices LD#m being divided into three "RAID-5" groups, themselves subdivided into three logic units LUN#m, three identification number values ID#z are defined for each sub-array, for example the hexadecimal values 02, 03 and 04 for the first sub-array (the logic units assigned to the processor SP-A in the normal mode) and 08, 09 and 0A for the second sub-array (the logic units assigned to the processor SP-B in the normal mode).

"TABLE 2" placed at the end of the present specification constitutes the complete address table of the "targets" as a function of the initial configuration ("RAID-1" or "RAID-5" type redundancy). In this table, the column "LD#" is common to both initial configurations.

It is clear from this table that in "RAID-5" mode, in order to address a particular virtual disk, i.e., one of the logic devices LD#00 through LD#17, it is necessary to use a combined pair ID#z/LUN#m, m having one of the three values 00, 01 or 02, no matter what the "RAID-5" group and the sub-array of logic devices (LD#00 through LD#08 assigned to the processor SP-A or LD#09 through LD#17 assigned to the processor SP-B).

In "RAID-1" mode, there is a one-to-one correspondence between the logic unit numbers LUN#m and the logical device numbers LD#m (expressed in hexadecimal form for the latter), it being understood that in this case LD#08, LD#16 and LD#17 are not assigned to any logic unit LUN#m. The identification number ID#z being constant, it is therefore only necessary to know the number of a logic unit in order to address it.

It is also understood that the various address parameters of the logic device LD#00, as shown in "TABLE 2," are identical (LUN#00, ID#02) no matter what the type of redundancy. This property makes it possible, using a standard interrogation command, to determine the type of redundancy initially configured.

Before further describing the redundant connecting process according to the invention, the logical architecture of the input-output controller Ctl will first be described in reference to FIG. 5.

Figure 5:
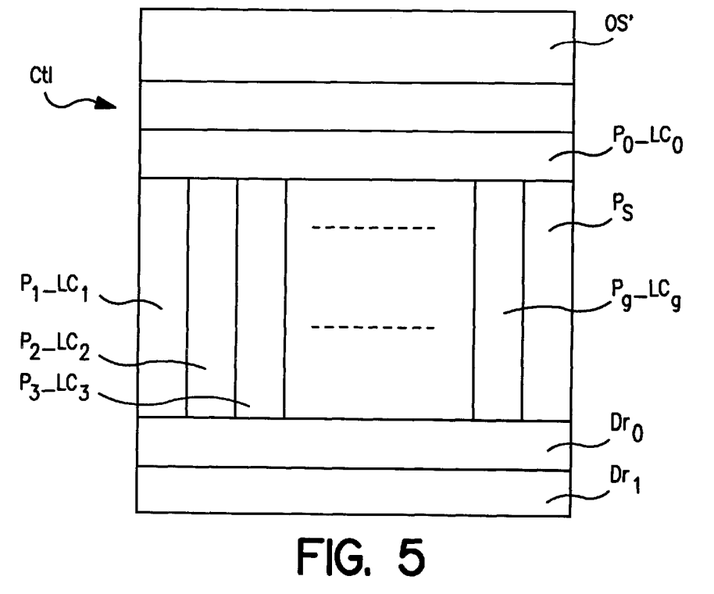
FIG. 5 illustrates an exemplary logical architecture of a controller used in the system of FIG. 4.

This FIG. 5 represents the various logical layers of the controller Ctl. The top layer is constituted by a real-time operating system OS', for example of the "GPOS" type described in French patent No. 2 679 351 in the name of the Applicant. The two layers immediately below it are constituted by "program module-logical channel" pairings. The first layer is constituted by a general process management module $P_0$ (or "process manager") and a logical channel $LC_0$, which are common to the other management modules and the other channels. The channels LC1 through LC9 are the logical channels associated with the various logical devices in a sub-array (LD#00 through LD#08 for SP-A, or LD#09 through LD#17, for SP-B). They correspond to the numbers LC#01 through LC#09 in "TABLE 2." The two bottom layers are management modules, or "drivers" $DR_0$ and $DR_1$, which manage the ports $Po_0$ and $Po_1$ (FIG. 4) respectively. The processing modules $P_1$ through $P_9$ manage the corresponding logical channels $LC_1$ through $LC_9$, and use the appropriate port $Po_0$ or $Po_1$ to transmit "SCSI" commands (in the example described) to the processor SP-A or SP-B, depending on the logic unit to be accessed.

Considered globally, the logical architecture described up to this point is itself common to the prior art. However, according to a first important characteristic of the invention, the logical layer of "processing modules/logical channels" is supplemented by a specific program module $P_S$, called a "supervisory" module, whose operation will be described below.

In the normal mode, when one of the logic units assigned to the active processor SP-A is accessed (for example at the address ID#03/LUN#01 in "RAID-5" mode), a "SCSI" command is transmitted through the port $Po_0$ (FIG. 4) to this processor, under the control of the management program module $Dr_0$, and uses the bus $B_0$, i.e., the so-called "normal" path for this processor. Under these conditions, the processor SP-B is a backup, as is the bus $B_1$. The program module $P_S$ then continuously polls the status of the processor SP-B and of the path leading to it, using the free bus $B_1$ and the port $Po_1$, under the control of the management program module $Dr_1$. To illustrate the concepts, the polling period is typically 2 seconds.

When a failure state is detected, no matter what the cause (failure or malfunction of the processor SP-B, bad contacts in the conductors constituting the bus $B_1$, disconnection of the latter, etc.), the controller transmits a "SCSI" command of the above-mentioned "trespass" type to the "surviving" storage processor, in this case the processor SP-A, via the remaining available path, i.e., the port $Po_0$, and the bus $B_0$. This command results in the switching of all the logic units to the processor SP-A and their assignment to this processor. From then on, access to these logic units is gained through the processor SP-A. Naturally, the same is true for the logic units that were previously assigned to it.

Thus, the operation moves into the "degraded" mode. A "warning signal" is transmitted to the central processing unit CPU (FIG. 4), but the operations described above remain transparent for the central processing unit CPU, and particularly for its operating system OS. The latter continues to transmit requests for the "switched" units as it did previously in the "normal" mode. The "warning signal" is recorded in a failure table. Advantageously, this serves to indicate the existence of the "degraded" mode and the record can later be used for maintenance purposes (for example, the replacement of the defective elements).

The process just described for the storage processor SP-A operates in identical fashion for the processor SP-B. If a logic unit assigned to this processor is accessed (for example at the address ID#08/LUN#02 in "RAID-5" mode), the program module $P_S$ continuously polls the state of the processor SP-A and of the path leading to it, using the free bus $B_0$ and the port $Po_0$, under the control of the management program module $Dr_0$. If a failure of the backup path is detected, all of the logic units assigned to the processor SP-A are switched to the processor SP-B and the operation moves into the degraded mode as before. Likewise, a warning signal is generated by the controller Ctl, and is made to "ascend" to the central processing unit CPU.

In an additional variant of the invention, all of the logical devices LD#00 through LD#17, and hence all of the logical units LUN#m as well, are initially assigned to the same data storage processor, for example the processor SP-A. If a failure is detected on the backup path, a warning signal is generated, as before, by the controller Ctl and made to "ascend" to the central processing unit CPU, indicating the existence of a "degraded" mode. However, since no data storage resource is assigned to the processor SP-B, there cannot be any switching of same to the processor SP-A.

According to another important characteristic of the invention, when a failure is detected during the execution of an input-output ("I/O") instruction, a signal of the above-mentioned "trespass" type is transmitted through the backup path in order to also switch the logic units from the active storage processor to the backup storage processor, and to assign them to it. A so-called "marginal" condition is generated for each of the input-output instructions in the process of being executed and a new attempt is made using the backup path. For this purpose, the input-output instructions are stored in the controller Ctl until the execution is complete.

According to an additional aspect of the invention, when no input-output ("I/O") instructions are being executed, a continuous supervision of the state of the "normal" path and of the associated processor (for example SP-A) is carried out under the control of the pairs of processing modules $P_1$ through $P_9$ and logical channels $LC_1$ through $L_9$. This supervision is carried out by the looped sending of input-specialized output instructions for this task.

As before, and in both cases just described (execution of unsuccessful input-out instructions, looped supervisory cycle), the degraded mode is initiated and a warning signal is made to "ascend" to the central processing unit CPU.

According to the process of the invention, a dual supervision is carried out: a first supervision, via the active or current path, for the input-output commands in the process of being executed, and a second supervision, via the backup path, for polling the state of the backup storage processor, and hence of the logic units that are assigned to it. Thus, the performance of the logical channels is practically unaffected by this second supervision (the wait for responses or "timeout" that occurs via the backup path).

The process according to the invention can also accommodate failures or malfunctions due to the management modules $Dr_0$ of the port $Po_0$ and $Dr_1$ of the port $Po_1$. A failure detected at this level also causes, under the control of one of the processing modules $P_1$ through $P_9$ associated with the logical channels $LC_1$ through $LC_9$ of the controller Ctl, a switching to the "surviving" port (for example $Po_1$, if it is the port $Po_0$ and the "driver" $Dr_0$ that are malfunctioning) and the generation of a command of the above-mentioned "trespass"type transmitted to the storage processor attached to this port (for example SP-B). This is followed by a switching of all the logic units previously assigned to the other processor (for example SP-A) and their assignment to the backup processor (for example SP-B). Likewise, if the specific program module ("process manager") $P_S$ is malfunctioning, a signal of the "trespass" type is transmitted through the active path in order to switch the logic units assigned to the backup storage processor whose status has not been able to be polled (for example SP-B) to the active storage processor (for example SP-A).

In both cases, the degraded mode is initiated and a warning signal is made to "ascend" to the central processing unit CPU.

Preferably, after moving into the degraded mode of operation, particularly in order to avoid so-called "ping-pong" effects, no automatic reconfiguration takes place, even if the malfunctioning elements become operational again. All access to the data storage resource continues to take place through the storage processor that remained operational during the appearance of the failure detected, and through the associated path, until one of the following actions is undertaken:

an action by an operator that results in the reconfiguration of the data storage subsystem using specific commands of the controller Ctl;

or a complete reinitialization of at least the data storage subsystem after a power down.

During the initialization of the system, it is necessary to determine which mode it should operate in: the normal mode or the degraded mode. In other words, it is necessary to determine whether the two storage processors and the associated paths are operational. In this case, it is possible to configure the data storage subsystem in the normal operating mode and to assign the logic units in accordance with "TABLE 2." In the opposite case, all of the logic units are assigned to the only "surviving" storage processor, the degraded operating mode is adopted, and a warning signal is recorded in the above-mentioned failure table. Initial tests are also performed to detect the proper operation of the management modules $DR_0$ and $DR_1$, and of the supervisory program module $P_S$. The results of these tests determine both the operating mode to be adopted and the initial configuration: normal mode or degraded mode.

It is noted that the process according to the invention makes it possible not only to obtain complete transparency relative to the operating system of the central processing unit CPU, even in the degraded mode (a "masking" effect), but to provide a backup path.

The system described above nevertheless still has a weak "link" in the chain for transmitting commands and/or data. In effect, if the controller Ctl malfunctions, despite the high redundancy in the data storage subsystem, either in the multiple disk array MD (FIG. 4) through the adoption of a "RAID-1" or "RAID-5" configuration (or of any other redundancy mode), or as a result of all the storage processors SP-A and SP-B operating redundantly (and the adopted dispositions specific to the process of the invention), there is no longer an available path between the central processing unit CPU (and its operating system OS) and the storage resources of the multiple disk array MD.

Figure 6:
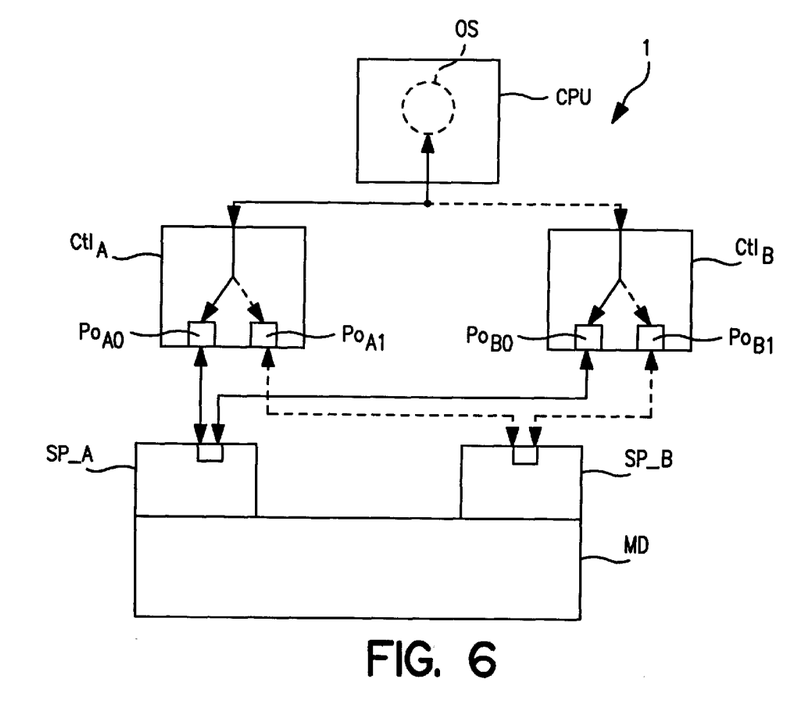
FIGS. 6 and 7 illustrate additional exemplary embodiments of data processing systems according to the invention.

To eliminate this defect, additional redundancy is advantageously provided at the level of the input-output controller, by backing it up with a second controller. FIG. 6 schematically illustrates an architecture of this type.

From this point on, the system comprises two input-output controllers $Ctl_A$ and $Ctl_B$, respectively. Each controller $Ctl_A$ or $Ctl_B$ "sees" the logic units LUN#m identically, i.e., assigned in the same way to either of the two processors SP-A or SP-B. In the normal operating mode, the logic units assigned to the processor SP-A are accessed through the port $Po_{A0}$ of the controller $Ctl_A$. In the event of a failure of the controller $Ctl_A$ these logic units are accessed through the corresponding port $Po_{B0}$ of the controller $Ctl_B$. The operating system OS of the central processing unit CPU loses one datacommand transmission path, but can continue to access the storage resources via the "surviving" controller. For its part, the processor SP-B is attached to the controllers $Ctl_A$ and $Ctl_B$ through the ports $Po_{A1}$ and $Po_{B1}$, respectively.

The mechanism for switching the logic units LUN#m and reassigning them to either of the storage processors SP-A or SP-B operates in a way identical to that described above.

Calculations show that the probability of a simultaneous breakdown of both levels of controllers (the input-output controllers $Ctl_A$ and $Ctl_B$, and the storage controllers SP-A and SP-B) is extremely low.

Figure 7:
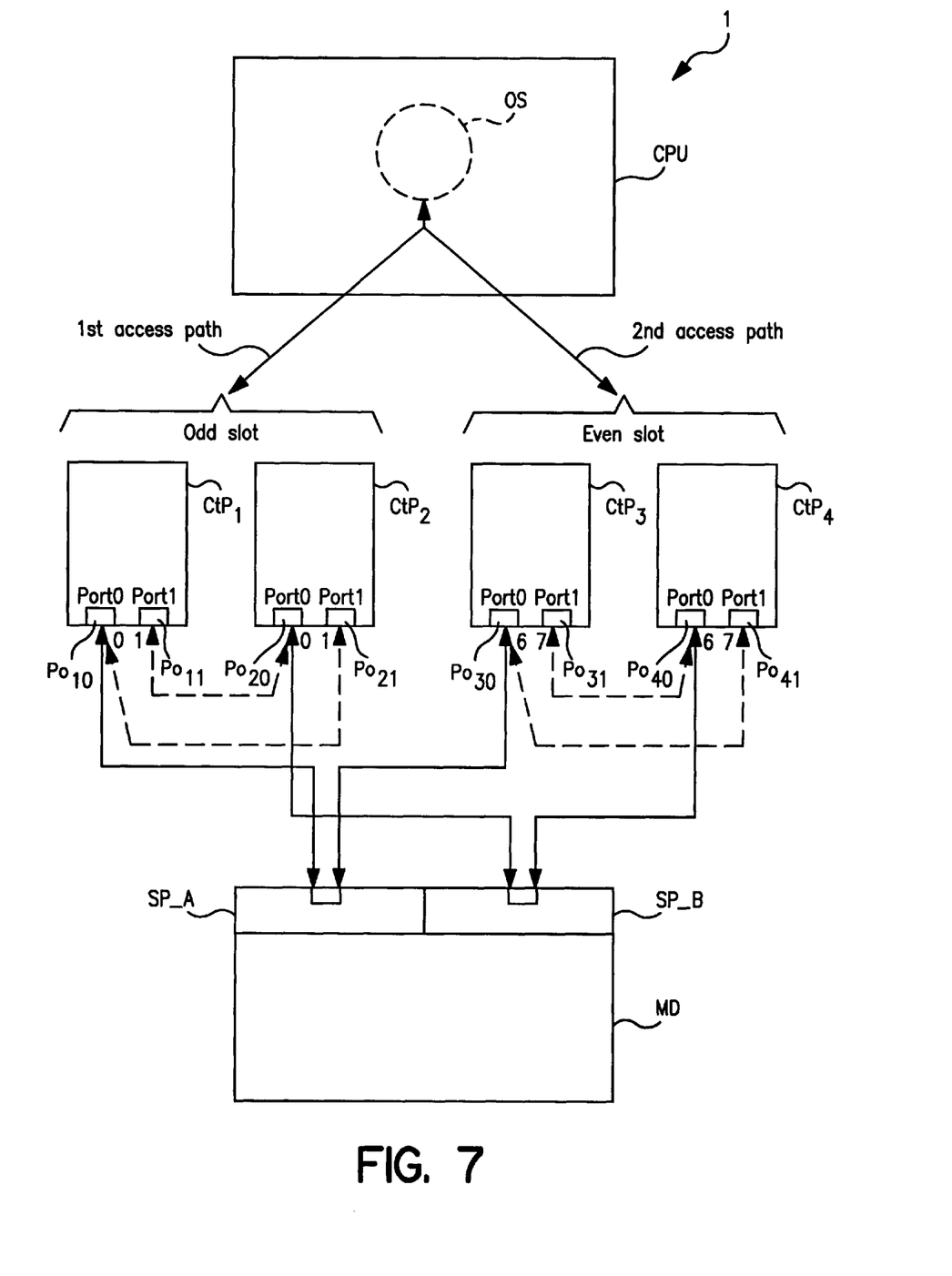

Although the architecture described above fully meets the needs of the invention, it is also possible to improve it, particularly in order to ensure greater operational parallelism by doubling the number of input-output controllers, i.e., by providing two redundant sets, or four controllers $Ctl_1$ through $Ctl_4$, as illustrated schematically by FIG. 7.

For practical purposes, it is assumed that the controllers are each embodied on a printed circuit card and that these cards are plugged into connection points. Moreover, in order to differentiate between them during the addressing by the operating system OS of the central processing unit CPU, it is assumed that the cards of the controllers $Ctl_1$ and $Ctl_2$ are plugged into the odd-numbered points (or "slots"), and that the cards of the controllers $Ctl_3$ and $Ctl_4$ are plugged into the even-numbered slots. The controllers $Ctl_1$ and $Ctl_2$ constitute, for the operating system OS of the central processing unit CPU, the first access path for the groups of logical devices assigned to the processors SP-A and SP-B, respectively. The controllers $Ctl_3$ and $Ctl_4$ constitute the second access path for the groups of logical devices assigned to the processors SP-A and SP-B, respectively.

The ports "0", $Po_{10}$ and "1" $Po_{21}$ of the first and second controllers $Ctl_1$ and $Ctl_2$ are connected to one another through a bus. The ports "1", $Po_{11}$ and "0," $Po_{20}$ of the first and second controllers $Ctl_1$ and $Ctl_2$, are connected to one another through a bus. Likewise, the ports "0"$Po_{30}$ and "1," $Po_{41}$ of the third and fourth controllers $Ctl_3$ and $Ctl_4$ are connected to one another through a bus. The ports "1", $Po_{31}$ and "0," $Po_{40}$ of the third and fourth controllers $Ctl_3$ and $Ctl_4$ are connected to one another through a bus. All of these busses are represented in broken lines in FIG. 7 and form backup paths for access to a given logical device.

The ports "0", $Po_{10}$ and $Po_{30}$ of the controllers $Ctl_1$ and $Ctl_3$ are connected through a first pair of busses to the first storage processor SP-A and the ports "0," $Po_{20}$ and $Po_{40}$ of the controllers $Ctl_2$ and $Ctl_4$ are connected through a second pair of busses to the second storage processor SP-B. These busses are represented in solid lines and constitute "normal" paths for access to a given logical device.

For architectures like the one illustrated by FIG. 6, and in greater detail by FIG. 7, it is necessary to define an addressing configuration for assigning the various "SCSI" ports of the controllers $Ctl_1$ through $Ctl_4$, in addition to the configuration for addressing the targets defined by "TABLE 2."

The group of logical devices assigned to the processor SP-A is called G1, and the group of logical devices assigned to the processor SP-B is called G2. The numbers of logical devices corresponding to these groups are called LD#G1 and LD#G2. Lastly, the "SCSI" number that is the "initiator" of the controllers $Ctl_1$ through $Ctl_4$, is called ID. The number ID for each controller is different and must follow an appropriate rule, for example, the one indicated below. Thus, the following configuration table for the addressing of these controllers is obtained:

| Access | Group | Slot | Ports/ID |
| --- | --- | --- | --- |
| 1st | LD#G1 | odd | Port 0, ID = 0; Port 1, ID = 1 |
| 1st | LD#G2 | odd | Port 0, ID = 0; Port 1, ID = 1 |
| 2nd | LD#G1 | even | Port 0, ID = 6; Port 1, ID = 7 |
| 2nd | LD#G2 | even | Port 0, ID = 6; Port 1, ID = 7 |

However, there is missing information that would make it possible to configure the access to a group of controlled logical devices. A physical channel number PC is used for this purpose. The group G1 is declared in a modulo-4 PC number, and the group G2 in a (modulo-4)+2 PC number.

The table above, in association with "TABLE 2", makes it possible to unambiguously address any resource through any access path, i.e. any logic unit accessible individually by the operating system OS of the central processing unit CPU, no matter what type of redundancy ("RAID 1" or "RAID-5") has been configured for the multiple disk array MD.

By reading the above, it is easy to see that the invention clearly achieves the objects set for it. In particular, it allows complete transparency vis-a-vis the operating system of the central processing unit, while offering high redundancy and limiting overload effects in the degraded operating mode.

It must be clear, however, that the invention is not limited to just the exemplary embodiments explicitly described, particularly in relation to FIGS. 4 through 7. In particular, the total number of elementary physical disks in the multiple disk array and their capacity depends on the intended application. Likewise, as indicated above, the type of redundancy adopted is not limited to just the two expressly described ("RAID-1" and "RAID-5"). Finally, although the central processor has implicitly been considered to be of the single-processor type, a multiprocessor architecture is fully possible and remains within the scope of the invention.

TABLE 1

| Disk $D_1$ | Disk $D_2$ | Disk $D_3$ | Disk $D_4$ | Disk $D_5$ |
| --- | --- | --- | --- | --- |
| Parity $P_1$ | Seg. $S_0$ | Seg. $S_1$ | Seg. $S_3$ | Seg. $S_4$ |
| Seg. $S_5$ | Parity $P_2$ | Seg. $S_5$ | Seg. $S_6$ | Seg. $S_7$ |
| Seg. $S_8$ | Seg. $S_9$ | Parity $P_3$ | Seg. $S_{10}$ | Seg. $S_{11}$ |
| Seg. $S_{12}$ | Seg. $S_{13}$ | Seg. $S_{14}$ | Parity $P_4$ | Seg. $S_{15}$ |
| Seg. $S_{16}$ | Seg. $S_{17}$ | Seg. $S_{18}$ | Seg. $S_{19}$ | Parity $P_5$ |
| Seg. $S_{20}$ | Seg. $S_{21}$ | Seg. $S_{22}$ | Seg. $S_{23}$ | Seg. $S_{24}$ |
| Parity $P_6$ | Seg. $S_{25}$ | Seg. $S_{26}$ | Seg. $S_{27}$ | Seg. $S_{28}$ |
| ... | ... | ... | ... | ... |
| Seg. $S_x$ | Seg. $S_{x+1}$ | Parity $P_y$ | Seg. $S_{x+2}$ | Seg. $S_{x+3}$ |

TABLE 2

| | "RAID-1" MODE | | | | "RAID-5" MODE | | | |
| --- | --- | --- | --- | --- | --- | --- | --- | --- |
| LD# | PC# | LC# | ID# | LUN# | PC# | LC# | ID# | LUN# |
| 00 | 0 | 01 | 02 | 00 | 0 | 01 | 02 | 00 |
| 01 | 0 | 02 | 02 | 01 | 0 | 02 | 02 | 01 |
| 02 | 0 | 03 | 02 | 02 | 0 | 03 | 02 | 02 |
| 03 | 0 | 04 | 02 | 03 | 0 | 04 | 03 | 00 |
| 04 | 0 | 05 | 02 | 04 | 0 | 05 | 03 | 01 |
| 05 | 0 | 06 | 02 | 05 | 0 | 06 | 03 | 02 |
| 06 | 0 | 07 | 02 | 06 | 0 | 07 | 04 | 00 |
| 07 | 0 | 08 | 02 | 07 | 0 | 08 | 04 | 01 |
| 08 | 0 | — | 02 | — | 0 | 09 | 04 | 02 |
| 09 | 2 | 01 | 02 | 09 | 2 | 01 | 08 | 00 |
| 10 | 2 | 02 | 02 | 0A | 2 | 02 | 08 | 01 |
| 11 | 2 | 03 | 02 | 0B | 2 | 03 | 08 | 02 |
| 12 | 2 | 04 | 02 | 0C | 2 | 04 | 09 | 00 |
| 13 | 2 | 05 | 02 | 0D | 2 | 05 | 09 | 01 |
| 14 | 2 | 06 | 02 | 0E | 2 | 06 | 09 | 02 |
| 15 | 2 | 07 | 02 | 0F | 2 | 07 | 0A | 00 |
| 16 | 2 | — | 02 | — | 2 | 08 | 0A | 01 |
| 17 | 2 | — | 02 | — | 2 | 09 | 0A | 02 |

What is claimed is:

1. A process for connecting the central processing unit (CPU) of a data processing system to a subsystem comprising data storage resources (MD) placed under the control of two data storage controllers (SP-A, SP-B) operating redundantly, said central processing unit (CPU) being associated with at least one input-output controller (Ctl) communicating with said data storage controllers (SP-A, SP-B) through two separate data transmission paths ($B_0$, $B_1$), characterized in that it comprises at least the following steps:

1) an initial step for assigning at least some of said data storage resources ($PD_1$–$PD_6$) to a first data storage controller (SP-A), thereby establishing a normal data transmission path ($B_0$) between said assigned some of data storage resources ($PD_1$–$PD_6$) and said first data storage controller (SP-A) and a backup data transmission path ($B_1$) between any unassigned data storage resources ($PD_1$–$PD_6$) and a second data storage controller (SP-B);

2) a step for directing control through at least one input-output controller, via said normal data transmission path ($B_0$), to at least one of said data storage resources assigned to said data storage controller (SP-A), which is said to be active, wherein said second data storage controller (SP-B) is said to be inactive; and 3) a step for continuously polling, via said backup data transmission path ($B_1$), the state of said backup data storage controller (SP-B) and of said backup data transmission path ($B_1$).

2. The process according to claim 1, characterized in that said initial step is comprised of assigning a first partition ($PD_1$–$PD_3$) of said data storage resources to a first data storage controller (SP-A) and a second partition ($PD_4$–$PD_6$) to a second data storage controller (SP-B), and in the event that a failure state is detected during said continuously polling step, said process comprises an additional step for switching said data storage resources assigned to said backup data storage controller (SP-B) to said active data storage controller (SP-A), and for reassigning them to the latter.

3. The process according to claim 2, characterized in that, each input-output controller (Ctl) associated with said central processing unit (CPU) storing a program module ($P_S$) for continuously polling the state of said backup data storage controller (SP-B) via said backup data transmission path ($B_1$), the process comprises, in the event of a failure state of this supervisory program module ($P_S$) or of the backup path (B1), an additional step for switching said data storage resources assigned to said backup data storage controller (SP-B) to said active data storage controller (SP-A), and for reassigning them to the latter.

4. The process for connecting the central processing unit (CPU) of a data processing system to a subsystem comprising data storage resources (MD) placed under the control of two data storage controllers (SP-A, SP-B) operating redundantly, said central processing unit (CPU) being associated with at least one input-output controller (Ctl) communicating with said data storage controllers (SP-A, SP-B) through two separate data transmission paths ($B_0$, $B_1$), characterized in that it comprises at least the following steps:
1) an initial step for assigning at least some of said data storage resources ($PD_1$–$PD_6$) to a first data storage controller (SP-A);
2) a step comprised of executing input-output commands, transmitted by an input-output controller (Ctl) via said normal data transmission path ($B_0$), in order to access one of said data storage resources assigned to said active data storage controller (SP-A);
3) a step for continuously polling the state of this controller (SP-A) and of said normal data transmission path ($B_0$);
and in that when a failure state is detected during this last step, it comprises the following subsequent steps:
  a/ a step for switching said storage resources assigned to the active data storage controller (SP-A) to the backup data storage controller (SP-B) and for reassigning said switched storage resources to said backup data storage controller (SP-B); and
  b/ a step for re-executing said input-output commands via said backup data transmission path ($B_1$).

5. The process according to claim 4, characterized in that it comprises an additional step, when no input-output command is executed, comprised of the continuous supervision of the state of said active controller (SP-A) and of said normal data transmission path ($B_0$).

6. The process according to claim 1, characterized in that each input-output controller (Ctl) associated with said central processing unit (CPU) being equipped with two input-output ports ($Po_0$, $Po_1$), connected through data transmission busses ($B_0$, $B_1$) to said data storage controllers (SP-A, SP-B), and storing program modules ($D_0$, $D_1$) for managing these input-output ports ($Po_0$, $Po_1$), the process comprises, in the event of a failure state of one of these port management program modules ($D_0$ or $D_1$), an additional step for switching said data storage resources assigned to said data storage controller (SP-A or SP-B) associated with said malfunctioning port management program module ($D_0$ or $D_1$) to said data storage controller (SP-A or SP-B) associated with the other input-output port ($D_0$ or $D_1$) and for reassigning them to the latter.

7. The process according to claim 1, characterized in that it includes an additional step, when a failure state is detected, comprised of transmitting an information signal to said central processing unit (CPU) indicating said switching of data storage resources and the passage from a so-called normal functioning mode into a so-called degraded mode.

8. The process according to claim 7, characterized in that it includes an initial step comprised of a test for determining the state of said data storage controllers (SP-A, SP-B) and of the associated paths ($B_0$ $B_1$), and in accordance with the result of this test, of configuring the operation of said data storage resource subsystem (SP-A, SP-B, MD) in said normal mode or in said degraded mode.

9. The process according to claim 1, characterized in that it includes an initial step comprised of applying a given redundant configuration to said storage resources (MD).

10. The process according to claim 9, characterized in that, said storage resources (MD) being constituted by an array of individual magnetic disks ($D_1$–$D_{30}$), said redundant configuration is comprised of associating with each individual magnetic disk a second individual magnetic disk, called a mirror disk, and of redundantly recording on the latter the data recorded on the individual magnetic disk with which it is associated.

11. The process according to claim 9, characterized in that, said data storage resources (MD) being constituted by an array of individual magnetic disks ($D_1$–$D_{30}$), said redundant configuration is comprised of subdividing said array into at least one sub-array ($PD_1$–$PD_6$) of a given number of individual magnetic disks, of recording on said given number of individual magnetic disks a given number of so-called useable data blocks ($S_0$–$S_4$), and of associating with these data blocks at least one block of redundant, so-called parity data ($P_1$).

12. The process according to claim 9, characterized in that it includes an initial step comprised of determining the nature of said configuration of given redundancy.

13. A device for connecting the central processing unit (CPU) of a data processing system to a redundant data storage system, the device comprising at least one input-output controller (Ctl) associated with said central processing unit (CPU), two data storage controllers (SP-A, SP-B) operating redundantly, a first normal ($B_0$) and a second backup ($B_0$) data transmission bus ($B_0$, $B_1$) for each input-output controller (Ctl) connected to said data storage controllers (SP-A, SP-B) so as to form said normal ($B_0$) and said backup ($B_1$) data transmission path, and an array of data storage resources (MD) under the control of said storage controllers (SP-A, SP-B), in that a first partition ($PD_1$–$PD_3$) of said storage resources is assigned, in a so-called normal operating mode, to a first data storage controller (SP-A), and a second partition is assigned to the other data storage controller (SP-B), and in that each input-output controller (Ctl) comprises means ($P_S$) for continuously polling and detecting a failure state of the data storage controllers (SP-A, SP-B) and of the data transmission paths ($B_0$, $B_1$), and for switching and reassigning said data storage resources from one data storage controller to the other in the event that a failure state is detected;
  said device being configured to perform the following steps:
  1) an initial step for assigning at least some of said data storage resources ($P_1$–$PD_6$) to a first data storage controller (SP-A), thereby establishing said normal data transmission path ($B_0$) between said all or some of data storage resources ($PD_1$–$PD_6$) and said first data storage controller (SP-A) and said backup data transmission path ($B_1$) between any unassigned said all or some of data storage resources ($PD_1$–$PD_6$) and a second data storage controller (SP-B);
  2) a step for directing control through at least one input-output controller, via said normal data transmission path ($B_0$), to at least one of said data storage resources assigned to said data storage controller (SP-A), which is said to be active, wherein said second data storage controller (SP-B) is said to be inactive and;
  3) a step for continuously polling, via said backup data transmission path ($B_1$), the state of said backup data storage controller (SP-B) and of said backup data transmission path ($B_1$).

14. The device according to claim 13, characterized in that said means for continuously polling and detecting a failure state comprise a program module ($P_S$) stored in said input-output controller.

15. The device according to claim 13, characterized in that it comprises two input-output controllers ($Ctl_A$–$Ctl_B$), operating redundantly, associated with said central processing unit (CPU), each comprising a first input-output port ($Po_{A0}$, $Po_{B0}$) and a second input-output port ($Po_{A1}$, $Po_{B1}$), the first input-output port ($Po_{A0}$) of the first of said input-output controllers ($Ctl_A$) being connected through a first data transmission bus to said first data storage controller (SP-A) and the second input-output port ($Po_{A1}$) of this controller ($Ctl_A$) being connected through a second data transmission bus to said second data storage controller (SP-B), so as to form said normal path to said first (SP-A) and second (SP-B) data storage controllers, respectively, and the first input-output port ($Po_{B1}$) of the second of said input-output controllers ($Ctl_B$) being connected through a first data transmission bus to said first data storage controller (SP-A) and the second input-output port ($Po_{B1}$) of this input-output controller ($Ctl_B$) being connected through a second data transmission bus to said second data storage controller (SP-B), so as to form said backup path to said first (SP-A) and second (SP-B) data storage controllers, respectively.

16. The device according to claim 15, characterized in that it comprises two sets of input-output controllers ($Ctl_1$–$Ctl_2$, $Ctl_3$–$Ctl_4$) associated with said central processing unit (CPU), operating redundantly and disposed in parallel.

17. The device according to claim 13, characterized in that said data storage resources (MD) are constituted by an array of individual magnetic disks ($D_1$–$D_3$), in that these individual disks are grouped into an array forming a configuration of given redundancy, in that this array is divided into logic units ($LUN_0$–$LUN_2$) and in that these logic units are subdivided into first and second sub-arrays, the first sub-array of logic units being assigned to a first storage controller (SP-A) and the second sub-array of logic units being assigned to the second storage controller (SP-B).

* * * * *